(12) United States Patent
Alstmar

(10) Patent No.: US 6,364,094 B1
(45) Date of Patent: Apr. 2, 2002

(54) CHAIN CONVEYOR SYSTEM

(75) Inventor: Åke Alstmar, Partille (SE)

(73) Assignee: FlexLink Components AG (SE)

( * ) Notice: Subject to any disclaimer, the term of this patent is extended or adjusted under 35 U.S.C. 154(b) by 0 days.

(21) Appl. No.: 09/508,645

(22) PCT Filed: Sep. 18, 1998

(86) PCT No.: PCT/SE98/01681

§ 371 Date: Jun. 7, 2000

§ 102(e) Date: Jun. 7, 2000

(87) PCT Pub. No.: WO99/15443

PCT Pub. Date: Apr. 1, 1999

(30) Foreign Application Priority Data

Sep. 19, 1997 (SE) .............................. 9703383

(51) Int. Cl.⁷ .......................... B65G 17/06; B65G 17/20
(52) U.S. Cl. ....................................................... 198/852
(58) Field of Search ........................................ 198/852

(56) References Cited

U.S. PATENT DOCUMENTS

| | | |
|---|---|---|
| 1,965,285 A | 7/1934 | Gilstad |
| 3,768,631 A * | 10/1973 | Wahren ........................ 198/852 |
| 4,895,248 A * | 1/1990 | Wahren ........................ 198/852 |
| 5,402,880 A * | 4/1995 | Murphy ........................ 198/852 |
| 5,429,227 A * | 7/1995 | Krossmann et al. ........ 198/852 |
| 5,803,236 A * | 9/1998 | Wahren ........................ 198/852 |

FOREIGN PATENT DOCUMENTS

| | | | |
|---|---|---|---|
| CA | 934690 | * 10/1973 | ................ 198/852 |
| DE | 2646703 | * 4/1977 | ................ 198/852 |
| DE | 39 91 247 C2 | 10/1990 | |
| EP | 0323819 | * 7/1989 | ................ 198/852 |
| FR | 2564810 | * 1/1985 | ................ 198/852 |

* cited by examiner

Primary Examiner—Stephen T. Gordon
Assistant Examiner—Patricia Engle
(74) Attorney, Agent, or Firm—Lerner, David, Littenberg, Krumholz & Mentlik, LLP (57) ABSTRACT

A conveyor system comprising a conveyor chain, a chain guidance means and a guide support means. Each link comprises a link member (2), a connecting pin (7) and a bearing element (8). The second end of the link member has a first leg (11) and a second leg (12). The first leg has a first protrusion (6), which has a first through hole (9). The second leg has a second protrusion (18) arranged opposite the first protrusion (6), which has a second through hole (9') substantially coaxial with the first through hole (9) and of the same cross section. The first hole (9) and second through hole (9') are arranged to hold the connecting pin. The bearing element is substantially spherical. The first end has a substantially spherical bearing seat (10) arranged to cooperate with at least a part of the surface of the spherical bearing element.

23 Claims, 5 Drawing Sheets

CHAIN CONVEYOR SYSTEM

TECHNICAL FIELD

The present invention relates to a chain conveyor system and especially the coupling between individual conveyor chain links. The chain link has a link member which has a transport facilitating means, an underside and a lower portion extending downwardly from the underside and the transport facilitating means, the lower portion has means for attaching a plurality of chain links together to form a conveyor belt which is flexible in two dimensions. The lower portion includes a forward portion and a rearward portion, a pin, and a bearing element.

BACKGROUND OF THE INVENTION

Many conveyor chain links of the prior art accomplish the linking action between links by arrangements comprising two bearing elements, a substantially cylindrical plunge and a pin with a circular cross-section, preferably a steel pin. This assembly constitutes a gimbal joint which is used to obtain multidirectional linking between adjacent chain links, i.e. a freedom of movement in two dimensions.

In U.S. Pat. No. 5,402,880 an article carrying chain is disclosed. The chain is to be used in an article conveyor and it includes a plurality of interconnected moulded plastic chain link assemblies each having a planar top plate. A plurality of upper an lower tabs formed along the lower portions of the chain link assemblies serve to guide the chain relative to a pair of guide rails of the conveyor frame while permitting free removal of the chain link assemblies from the guide rails at selected areas along the length of the conveyor and also restraining the chain between the guide rails at other portions of the conveyor such as at curves or vertical bends. Important features of the linking assembly are the connecting pin, which is arranged between the adjacent links of the chain, and the holes of the link through which the connecting pin is arranged. The hole diameter is considerably larger than the connecting pin diameter enabling the pin to perform a movement relative to the link. Thus, the pin is not fixedly attached to the plunger, i.e. it is allowed to rotate and move in a radial direction of the pin. This has as a consequence the requirement that the connecting pin must be carefully designed in respect of e.g. choice of material of manufacture and it requires a high precision of manufacture.

In U.S. Pat. No. 3,768,631 a conveyor is disclosed which comprises a series of links which directly carry the articles to be conveyed. Each link includes a head portion from which extends a pair of bifurcated legs for receiving and being coupled to the head portion of an adjacent link. The link further comprises a carrier portion that is integral with the head potion and the legs. The upper side of the carrier portion is a continuous flat transport surface overlying the head portion and the legs and the transport surface at one end is defined by the upper periphery of the head portion. The opposite end of the carrier portion is a web interconnecting the legs and having a concave edge corresponding in shape to the periphery of the head portion. The carrier portion further includes a pair of side flange portions which extend longitudinally from the extremities of the legs and laterally to the head portion and which define the longitudinal edges of the continuous flat transport surface. Also this design utilizes a plunger and pin gimbal joint. Thus, this invention requires a carefully designed connecting pin since it is a crucial part if the linking assembly of the invention.

Neither of the arrangements described above disclose a device for limiting/preventing lateral movement between the chain links. Both above patents present inventions in which the interaction of the non-fixed connection pins and its corresponding holes, which have considerably larger dimensions than the pins, is crucial in obtaining a multidirectional linking between adjacent links.

An alternative arrangement to obtain multidirectional linking between adjacent chain links, i.e. a freedom of movement in two dimensions, is by utilizing a ball and socket type joint.

In U.S. Pat. No. 1,996,586 a conveyor is disclosed which comprises a series of chain links which are interconnected by a separate connecting element having concave bearing means which form ball and socket joints together with spheroidal elements arranged at each end of the elongated chain links. No continuous carrying surface is formed using this conveyor construction and all the pulling force transmitted from chain link to chain link will have to be absorbed by the axle holding the spheroidal elements. This axle is an integral part of the chain link and made of the same material as the link. Since the most widely used material for conveyor chains of the above type is plastic, the axle will not be sufficiently strong unless it is made having a sufficiently large cross-section. This results in relatively bulky chain links which are more costly and which require more space when in use. If the connecting element is provided with some sort of flat carrying surface, there is a great danger that the connecting element will turn over when a load is placed on the carrying surface, since it is only held by the two spherical bearings and thus lacks support against turning sideways.

In DE 39 91 247 is shown a conveyor link assembly comprising spherical bearing means. The spherical means 13 is held between the two legs at one end of a link 7 and is circumferred by the trailing link end opposite its leg end. It is not shown how the spherical means is held in its place, only a small axis 11, which seems to be inside another coaxial axis holding a pair of wheels, rolling in guides. How the parts are kept together cannot be seen nor is described. There seems to be a ring which can have a partly spherical inside seat being forced on the spherical element and pressed into the link end. Some sort of frictional and deforming forces have to be overcome, otherwise the parts should fall apart. It is also possible that glue or the like is used. The material of the parts seem to be metallic thus implicating the use of mounting tools. The trailing link end thus circumferes the spherical element without any shown gap, eliminating the risk of play and contact between links, at least when the guides are not twisting. This conveyor link assembly seems to be complicated to assemble with a lot of different parts. Once the problems to have the ring seat put in place around the spherical element and in the link are overcome, the design does not display any problems to keep it there, giving the parts have the proper dimensions.

In U.S. Pat. No. 4,524,865 a conveyor chain is disclosed which comprises a series of links which are interconnected by a ball and socket joint. Each elongate link has a ball element at one end and a socket element at the other, opposite end. When the ball element of a first link has been inserted into the socket element of a second link, a pin is inserted into holes at each side of the socket element so that the pin runs through an elongate hole in the ball element and the two links are held together in the travelling direction of the conveyor chain. The pin is held in the holes by splines formed on the pin at its two ends in order to prevent the pin from getting lose and falling out of the assembly. The pin prevents the ball element from popping out of the socket element during operation of the conveyor. A force working in a direction substantially perpendicular to the travelling direction of the conveyor is generated when the conveyor is in operation and this force will try to remove the ball element from the socket element, thus increasing the power demanded to propel the conveyor. In order to facilitate the insertion of a ball element into a socket element, the socket element can only be formed as partially encompassing the ball element. This results in a relatively small contact surface area between ball and socket in the travelling direction of the conveyor which could lead to breakage of individual links when a higher stress is put upon the chain, e.g. when the conveyor is made to turn in a curve. The whole arrangement is unsymmetrical regarding force distribution, both horizontally and vertically. The ball element and the socket element are made of the same material, since they are part of the same link element. This will result in increased squeaking when the conveyor chain is in operation, when the ball element is moved (rotated) relative the socket element. In addition, with design such as described the carrying surface will protrude excessively from the conveyor belt line when the chain is bent over a driving wheel or the like since the carrying surface is arranged far forward towards and over the ball element of each chain link.

SUMMARY OF THE INVENTION

A main object of the present invention is to overcome the above mentioned disadvantages and to provide an improved chain link conveyor having a joint between individual links which allows unrestricted movement of two adjacent chain links at least partially in two dimensions, which is self-adjusting with respect to the main guidance bearing surfaces, which allows a relative twisting movement between adjacent links in a direction perpendicular to the normal travelling direction of the chain link conveyor allowing the chain link conveyor to be twisted in a screw-like motion around its direction of travel, and which is strong and yet simple and cheap to manufacture.

A further object of the invention is to provide a ball and socket joint between individual links in which relative movement between adjacent links in a direction perpendicular to the normal travelling direction is minimized, which results in decreased or eliminated squeaking.

A still further object of the present invention is to provide a design of the ball and socket joint which can transmit a force in both forward and backward travelling directions of the conveyor.

This object is achieved in a conveyor system comprising a conveyor chain, a chain guidance means and a guide support means where said conveyor chain comprises a plurality of chain links, each link comprising a link member (2), a connecting pin (7) and a bearing element (8), where said link member has a cargo carrying means (20) and a lower link member portion (3) having a first end (4) and a second end (5), said second end having a first leg (11) and a second leg (12) arranged at a certain distance from each other, where said first leg has a first through hole (9), and said second leg has a second through hole (9') substantially coaxial with said first through hole (9), said first through hole (9) and second through hole (9') being arranged to hold said connecting pin, and where said bearing element is substantially spherical and has a third through hole (9") being arranged to hold said connecting pin, and said first end has a substantially spherical bearing seat (10) arranged to cooperate with at least a part of the surface of said spherical bearing element of an approximate chain link. The new and inventive introductions are that said bearing element (8) further has a first protruding section (31) and a second protruding section (32) adjacent to the two openings of said third through hole (9"), said two protruding sections being arranged to directly contact said first and second leg (11, 12) of said second end (5) of said link member (2) so that said two legs can only be bent towards said bearing element (8) up to said protruding sections.

Another new feature is that said spherical bearing element (8) further has a force absorbing means (15) extending toward an adjacent chain link and that said second end (5) of said link member (2) has a curved surface (16), where said force absorbing means and said curved surface cooperate to transfer the compression forces, generated when said conveyor is made to travel in a second travelling direction opposite to said first travelling direction, from one conveyor chain link to an adjacent conveyor chain link.

The chain guidance means generally consist of a conveyor frame having profiled guide rails arranged on at least two opposite sides of the conveyor chain. The guide rails define the conveyor chain path by allowing slide bearing surfaces on the chain links to slide on the guide rails whilst the chain links are held in a predetermined spacial position relative to each other and to the conveyor chain path. The cargo load is mainly transferred from the chain links to the conveyor frame via the slide bearing surfaces on the chain. Typically, the guide rails are made of extruded aluminium profiles. The guide support means are mounted to the guide rails to keep them in a fixed position relative to a floor or the like and typically consist of height adjustable metal legs.

Features of the invention are that said bearing element consists of a means incorporating a substantially partially spherical element connected to said shaft, said bearing element being connected to said shaft, said rearward portion defining two legs and being provided with transverse first and second holes at a distance from the forward portion, said first and second holes being intended to receive said pin provided with said bearing element, said bearing element being arranged between said legs, said forward portion having a spherical seat arranged to receive said bearing element thereby partly embracing the bearing element, the engagement between said spherical seat and the spherical element of a bearing element of an adjacent conveyor chain link being arranged to accomplish a multidirectional linking assembly, the width of said bearing element being substantially the same as the free space between the legs in the area of said first and second holes.

DETAILED DESCRIPTION OF THE PREFERRED EMBODIMENTS

Figure 1:
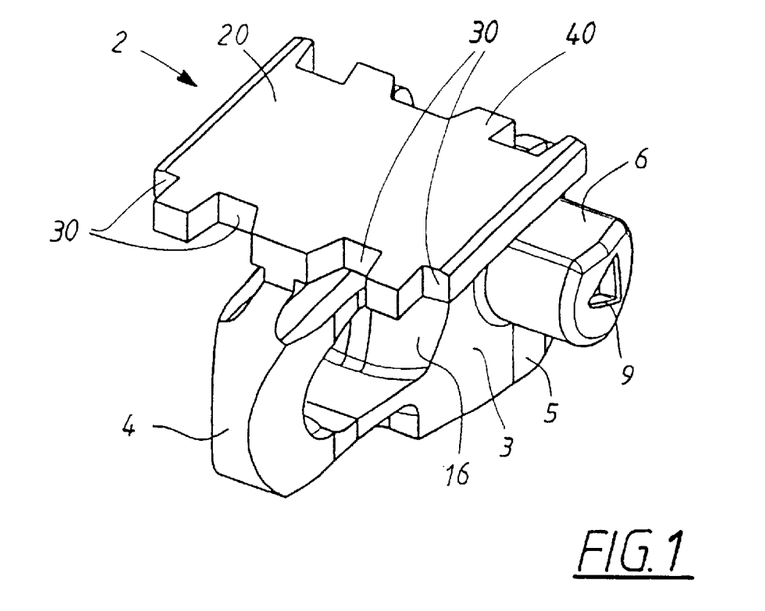
FIG. 1 shows a perspective side view of a link member according to the invention.
Figure 2:
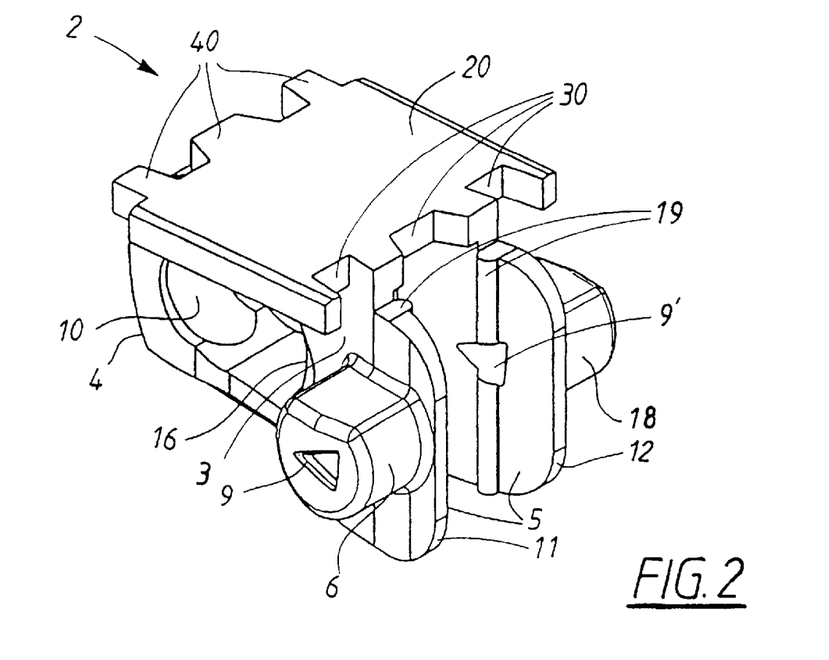
FIG. 2 shows another perspective side view of a link member according to FIG. 1.

In FIGS. 1 and 2, a link member 2 which can form a part of a conveyor chain link is shown. The link member has a lower portion 3 which has a first end 4 and a second end 5. The first end 4 has a substantially spherical bearing seat 10 which is arranged to cooperate with a bearing element 8 by partly embracing the bearing element (in a way which is most clearly shown in FIGS. 8 and 10). The second end 5 has a first leg 11 and a second leg 12 arranged at a certain distance from each other, the legs bifurcating out from the first end 4. The first leg 11 has a first protrusion 6 arranged substantially perpendicular to the travelling direction of the chain link conveyor and facing outwards from the first leg. The protrusions are advantageously utilised as transport facilitating means, i.e. used as engagement means for cooperation with a driving wheel or the like, for example interacting with cog wheels of a conveyor drive unit. The first protrusion 6 has a first through hole 9 of a non-circular cross-section, preferably substantially triangular. The second leg 12 has a second protrusion 18 arranged opposite to the first protrusion 6 and facing outwards from the second leg. The second protrusion 18 has a second through hole 9' substantially coaxial with the first through hole 9 of the first protrusion 6 and of the same cross-section. A vertical guidance rib 19 is arranged on the inside of each of the first and second legs 11 and 12 respectively. The second end 5 of the link member 2 further has a curved surface 16 arranged to cooperate with the bearing element 8.

A cargo carrying means 20 is arranged on the link member 2, preferably on its upper side. The cargo carrying means 20 is preferably shaped like a substantially flat surface having a plurality of notches 30 and teeth 40 arranged adjacent to the first end 4 and the second end 5. The notches and the teeth are arranged to mesh with the corresponding notches and teeth of an adjacent chain link.

Figure 12:
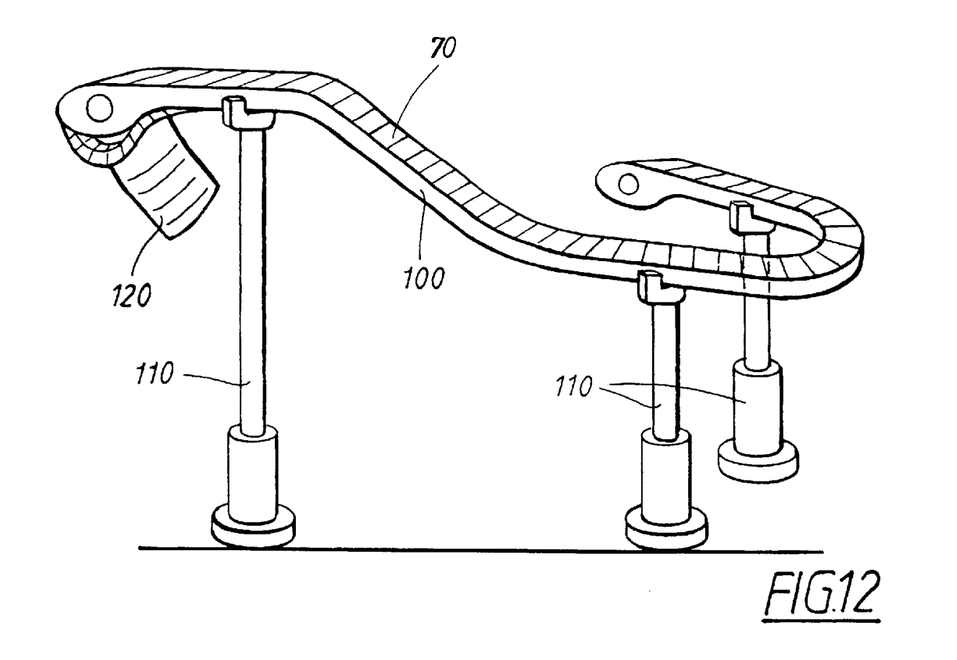
FIG. 12 shows a conveyor system according to the invention.

In an alternative embodiment, shown in FIG. 12, the cargo carrying means 20 is shaped like a substantially flat surface having a first step 50 adjacent to the first end 4 and a second step 60 adjacent to the second end 5 where the first step and the second step are arranged to mesh with the corresponding second step and first step respectively of an adjacent chain link of the conveyor. The link member 2 is advantageously integrally manufactured, i.e. manufactured in one piece, for example pressure cast or die-cast.

Figure 3:
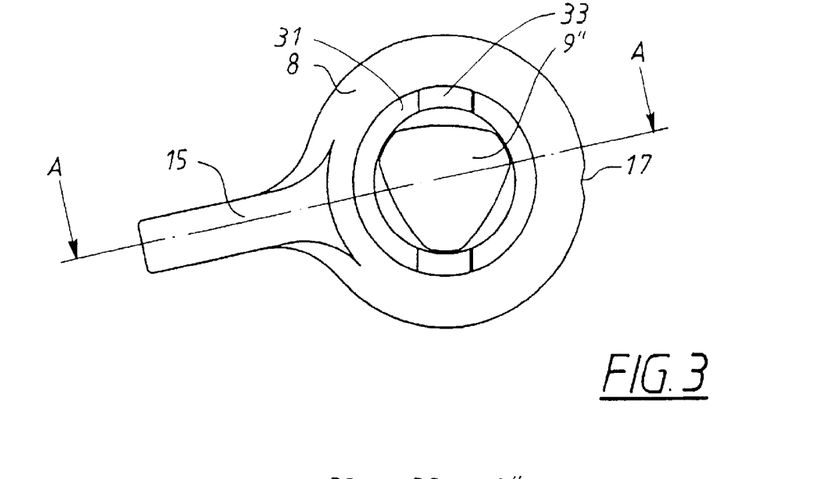
FIG. 3 shows a side view of a bearing element according to the present invention.
Figure 4:
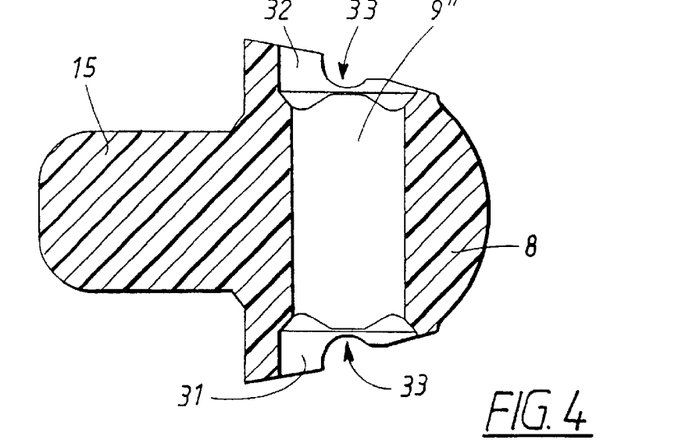
FIG. 4 shows a section view of a bearing element along the line A—A in FIG. 3.
Figure 5:
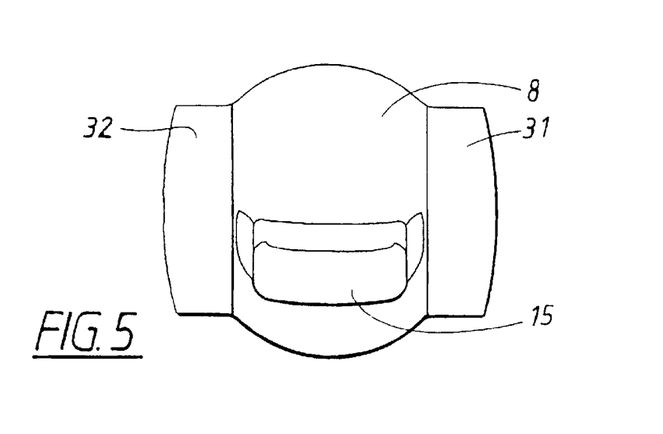
FIG. 5 shows a frontal view of a bearing element according to FIG. 3.

The bearing element 8 is shown in FIGS. 3–5 and comprises a substantially spherical main body having a third through hole 9" of a non-circular cross-section corresponding to the cross-section of the first through hole 9 and the second through hole 9'. The bearing element 8 is arranged between the first leg 11 and the second leg 12.

Figure 6:
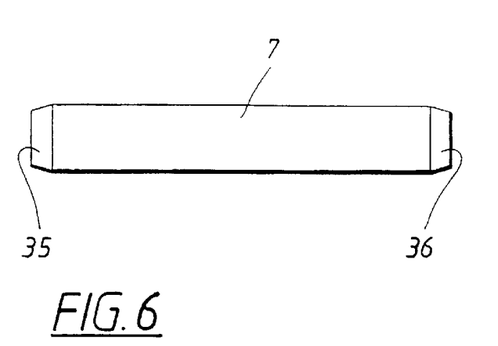
FIG. 6 shows a side view of a connecting pin according to the present invention.
Figure 7:
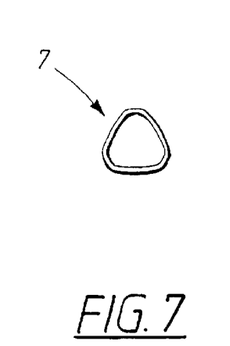
FIG. 7 shows a side view of a connecting pin according to FIG. 6.

A pin, shown in FIGS. 6 and 7, is arranged to be inserted into the three trough holes 9, 9', 9" to securely hold the bearing element 8 in position in the travelling direction of the conveyor chain. The cross-sectional shape of the pin 7 corresponds to the cross-section of the three through holes 9, 9', 9". The two ends of the pin 7 may advantageously be chamfered to facilitate insertion into the through holes.

Pin locking means (not shown) are advantageously arranged in the first through hole 9 and the second through hole 9' to prevent the pin 7 from falling out of the link element 2 once the pin has been inserted. The pin locking means may be shaped like small bumps protruding from the inner surface of the holes and which bumps are compressed sufficiently when the pin is inserted into the whole to allow the pin to enter the hole but which bump will prevent the pin from exiting the hole after insertion. The pin 7 is fixed at least to either the bearing element 8 or to the first through hole 9 and/or the second through hole 9' or to all three.

The cross-section of pin 7 is advantageously substantially triangular in order to absorb frictional forces, which appear at the relative movement between the bearing element 8 and the adjacent link member 2. The main purposes of the pin 7 is to accomplish a connection to an adjacent link member 2 and to prevent the bearing element 8 from falling out of its position. The bearing element 8 is thus fixed so that it cannot rotate relative the link member 2 in which it is held by the pin 7. The connecting pin 7 of the present invention is cheaper to manufacture and poses fewer requirements on high precision during manufacture and of high strength material.

The bearing element 8 further has a first protruding section 31 and a second protruding section 32 adjacent the two openings of the third through hole 9" in the bearing element. The two protruding sections 31, 32 are arranged to directly contact the first and second leg 11, 12 of the second end 5 of the link member 2 so that the two legs can only be bent towards the bearing element 8 up to the protruding sections.

The width of the bearing element 8 is thus substantially equal to the free space between the fist leg 11 and the second leg 12 in the area of the first through hole 9 and the second through hole 9'. In this way, a closed force field is formed within the first end 4 of the link member 2, the first leg 11 of the link member, the pin 7, the bearing element 8 and the second leg 12 of the link member. The force field is symmetrically distributed in the chain links, both horizontally and vertically.

A force absorbing means 15 is arranged on the side of the bearing element 8 which faces the second end 5 of the link member 2. The force absorbing means 15 cooperates with the curved surface 16 of the second end 5 of the link member 2 to transfer any compression forces which may be generated when the conveyor is made to travel in a second direction opposite to the normal travel direction or when the conveyor links are travelling at a slower speed relative to other parts of the conveyor chain such as just before an inclined portion of the conveyor.

Recesses 33 arranged in the first protruding section 31 and the second protruding section 32 cooperate with the guidance ribs 19 of the first and second legs 11 and 12 respectively to hold the bearing element 8 in a substantially fixed position relative to the link member 2 in which it is held with the pin 7.

In one embodiment of a bearing element according to the invention, a top portion 17 of the substantially partially spherical element is removed in order to avoid point contact but to facilitate ring contact. This decreases the risk of wearing out key components of the link assembly.

The object of the concave-convex contact between the bearing element 8 and the spherical seat 10 is to decrease or even eliminate squeaking caused by relative movement between adjacent links in perpendicular direction to the first transport direction.

Figure 8:
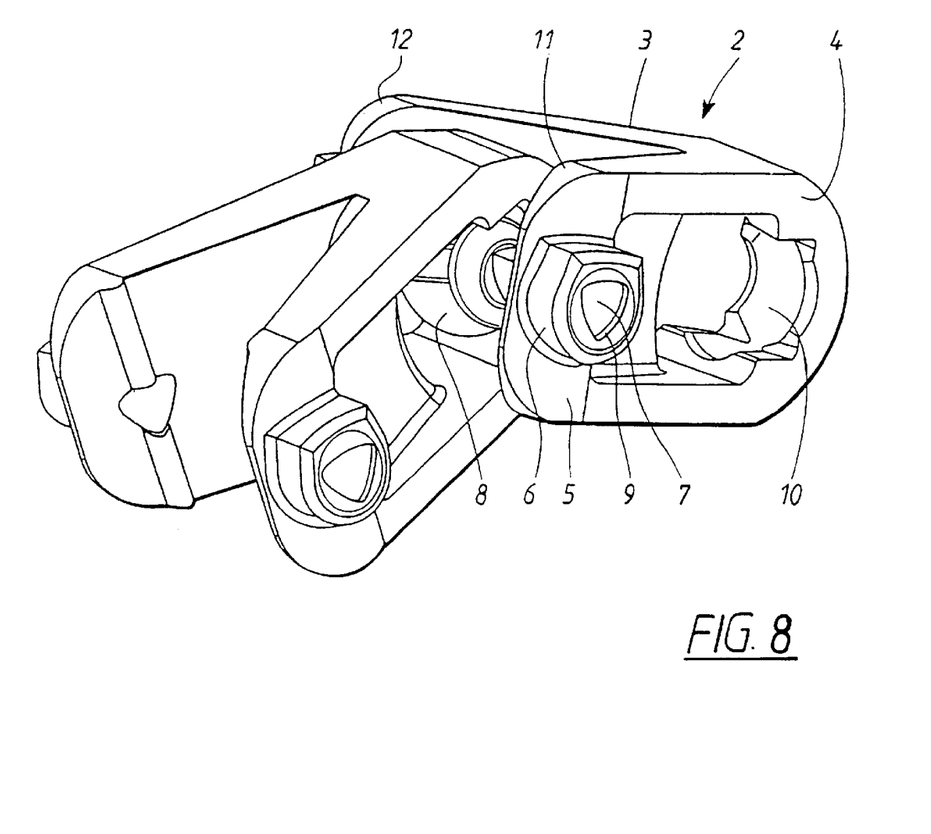
FIG. 8 shows an elevated side view of two connected links according to the invention.

FIG. 8 shows two link members 2 being linked together by a bearing element 8 and a pin 7. The cargo carrying means has been omitted from the drawing for clarity.

Figure 9:
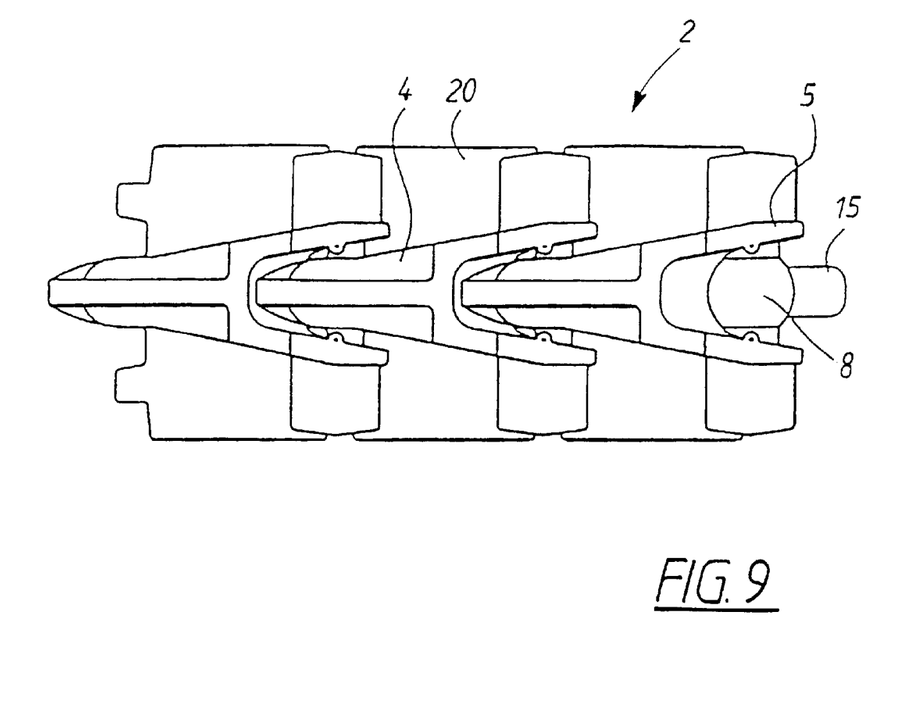
FIG. 9 shows a bottom view of a part of a conveyor chain according to the present invention.
Figure 10:
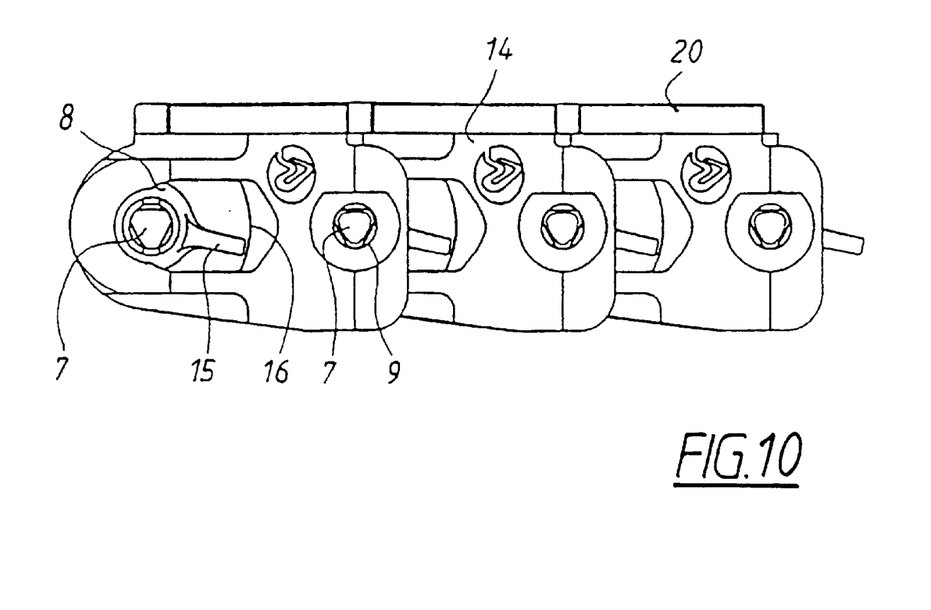
FIG. 10 shows a side view of a conveyor chain according to FIG. 9.
Figure 11:
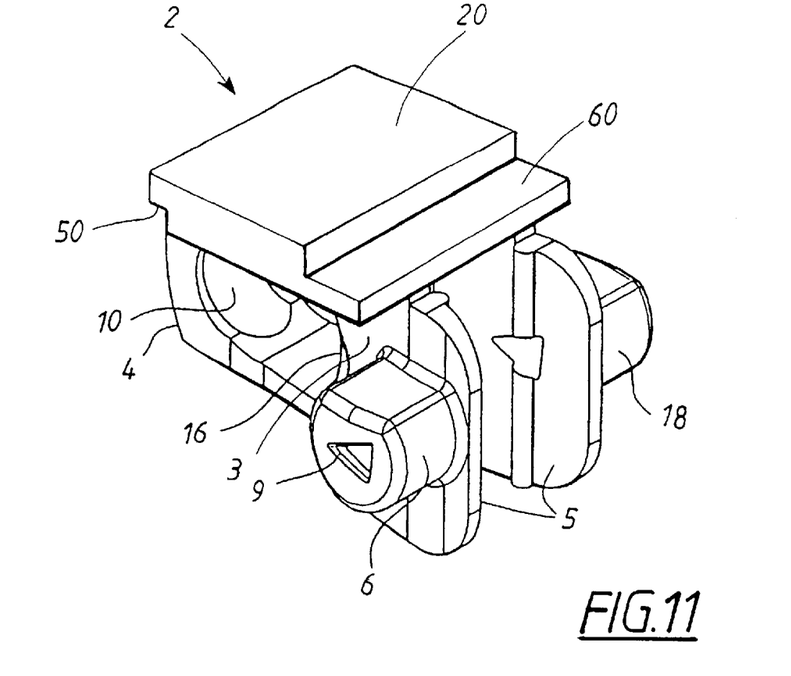
FIG. 11 shows an alternative embodiment of meshing means between the cargo carrying means of two adjacent chain links according to the invention.

In FIGS. 9 and 10 is shown how three link members are linked together in a similar way as in FIG. 8. Here also the cargo carrying means 20 is shown.

FIG. 12 shows a chain conveyor system according to the invention. A chain guidance means 100 preferably consisting of a conveyor frame having profiled guide rails arranged on at least two opposite sides of the conveyor chain 70. The guide rails define the conveyor chain path by allowing slide bearing surfaces on the chain links to slide on the guide rails whilst the chain links are held in a predetermined spacial position relative to each other and to the conveyor chain path. The cargo load is mainly transferred from the chain links to the conveyor frame via the slide bearing surfaces on the chain. Typically, the guide rails are made of extruded aluminium profiles. Guide support means 110 are mounted to the chain guidance means 100 to keep the conveyor chain 70 in a fixed position relative to a floor or the like and typically consist of height adjustable metal legs. A driving means 120 is arranged at one end of the conveyor chain loop.

The bearing element 8 may be provided with chamfered surfaces arranged at the openings of the third through hole 9″ or at least one washer-like element (not shown) may be provided on the pin 7 in conjunction with the bearing element 8 to facilitate insertion of the pin 7. However, these two measures will lead to a smaller contact surface between the bearing element 8 and the spherical seat 10, which will probably result in increased fatigue, since the spherical surface achieving the linking will be smaller.

By manufacturing the conveyor chain link of a material having a low coefficient of friction, such as an acetal plastic and/or polyamide, a cost advantage and a more favourable modulus of elasticity are achieved.

A major advantage of the present invention is that the number of individual and different parts making up the chain link assembly is very limited and the design of the link forms a closed force field which results in symmetrical load and lower wear.

The following sequence is followed when assembling the chain links into a conveyor belt:

1) the bearing element 8 is inserted into the spherical bearing seat 10 of the first end 4 of the link member 2, having the spherical part of the bearing element facing the bearing seat,
2) the first leg 11 and the second leg 12 of a further link member are placed so that the third through hole 9″ of the bearing element 8 lines up with the first through hole 9 and the second through hole 9′ of the further link member,
3) the pin 7 is inserted into the first through hole 9, the third through hole 9″ of the bearing element 8 and the second through hole 9′ of the further link member, to securely hold the bearing element in place,
4) further links are added by repeating steps 1) to 3).

The invention is not limited to the description above nor to the examples shown on the drawings, but may be varied within the scope of the appended claims. For example, it is possible to use a bearing element 8 of smaller diameter than the distance between the first leg 11 and the second leg 12. In this case the legs 11, 12 are provided with projections which together with the width of the bearing element 8 correspond to the distance between the legs 11, 12.

What is claimed is:

1. A conveyor system comprising:
    a chain guidance means;
    a guide support means; and
    a conveyor chain including a plurality of chain links, each link comprising a link member, a connecting pin and a bearing element, said link member including a cargo carrying means and a lower link member portion having a first end and a second end, said second end having a first leg and a second leg arranged at a certain distance from each other, said first leg defining a first through hole, and said second leg defining a second through hole substantially coaxial with said first through hole, said first through hole and second through hole being arranged to hold said connecting pin, said bearing element being substantially spherical and defining a third through hole arranged to hold said connecting pin, and said first end having a substantially spherical bearing seat arranged to cooperate with at least a part of the surface of said bearing element of an adjacent chain link, said bearing element further including a first protruding section and a second protruding section adjacent to the two openings of said third through hole, said two protruding sections being arranged to directly contact said first and second leg of said second end of said link member so that said two legs can only be bent towards said bearing element up to said protruding sections.

2. A conveyor system according to claim 1, further comprising:
    a vertical guidance rib arranged on the inside of each of the first and second legs to cooperate with recesses in the first and second protruding sections to hold the bearing element in a substantially fixed position relative to the link member.

3. The conveyor system according to claim 1, wherein said spherical bearing element further includes a force absorbing means extending toward an adjacent chain link and said second end of said link member further includes a curved surface, wherein said force absorbing means and said curved surface cooperate to transfer compression forces generated when said conveyor travels in a second traveling direction opposite to a first traveling direction, from one conveyor chain link to an adjacent conveyor chain link.

4. A conveyor system comprising:
    a chain guidance means;
    a guide support means; and
    a conveyor chain including:
        a plurality of chain links, each link comprising a link member including
            a cargo carrying means and a lower link member portion having a first end including a substantially spherical bearing seat and a second end defining a curved surface, said second end having a first leg and a second leg arranged at a certain distance from each other, said first leg defining a first through hole, and said second leg defining a second through hole substantially coaxial with said first through hole;
        a connecting pin; and
        a substantially spherical bearing element defining a third through hole and including a force absorbing means extending toward an adjacent chain link, wherein said first through hole, said second through hole and said third through hole are arranged to hold said connecting pin, said substantially spherical bearing seat arranged to cooperate with at least a part of the surface of said spherical bearing element of said adjacent chain link and said force absorbing means cooperates with said curved surface to transfer compression forces generated when said conveyor travels in a second traveling direction opposite to a first traveling direction from one conveyor chain link to said adjacent conveyor chain link.

5. A conveyor system according to any of claims 1–4, wherein said first leg further includes a first protrusion arranged substantially perpendicular to said first traveling direction of said chain link conveyor and facing outwards from said first leg, and said first through hole is positioned in said first protrusion, and said second leg further includes a second protrusion arranged opposite said first protrusion and facing outwards from said second leg, said second through hole being positioned in said second protrusion and being of the same cross-section as said first through hole and said third through hole having a cross-section corresponding to the cross-section of said connecting pin.

6. The conveyor system according to claim 5, wherein said cargo carrying means defines a substantially flat surface having a plurality of notches and teeth arranged adjacent to said first end and said second end, said notches and said teeth being arranged to mesh with corresponding notches and teeth of said adjacent chain link of the conveyor.

7. The conveyor system according to claim 5, wherein said cargo carrying means defines a substantially flat surface having a first step adjacent to said first end and a second step adjacent to said second end, said first step and said second step being arranged to mesh with a corresponding second step and first step respectively of said adjacent chain link of said conveyor.

8. The conveyor system according to claim 7, wherein said connecting pin defines a substantially non-circular cross-section, preferably substantially triangular.

9. A conveyor chain link comprising:

a transport facilitating means;

an underside;

a lower portion depending downwardly from the underside of the link member and including a forward portion and a rearward portion including two legs and defining transverse first and second holes at a distance from the forward position;

a pin, wherein said first and second holes receive said pin; and a bearing element including a substantially partially spherical element connected to said pin said bearing element being arranged between said legs, wherein said forward portion has a spherical seat arranged to receive said bearing element thereby partly embracing said bearing element, wherein the engagement between said spherical seat and the spherical element of a bearing element of an adjacent conveyor chain link is arranged to accomplish a multidirectional linking assembly, the width of said bearing element being substantially the same as the free space between the legs in the area of said first and second holes wherein said bearing element is provided with a force absorbing means incorporating a portion extending toward an adjacent link, said portion interacting with a curve surface of the adjacent link.

10. A conveyor chain link according to claim 9, wherein said first and second holes are of substantially the same cross section as said pin.

11. A conveyor chain link according to claim 9, wherein said bearing element includes a substantially ball-like element.

12. A conveyor chain link according to claim 11, wherein said ball-like element defines a through-hole for receiving said pin and chamfered surfaces arranged at the openings of said through-hole.

13. Conveyor chain link according to claim 9, wherein said first and second holes are arranged to extend through a shaft defining two parts, each of said parts being connected to said rearward portion and said shaft, said rearward portion and said forward portion being integrally manufactured, and said substantially partially spherical element being mountably arranged.

14. Conveyor chain link according to claim 9, wherein said two legs are arranged at a mutual angle.

15. Conveyor chain link according to claim 9, wherein said pin is fixed at least to said bearing element.

16. Conveyor chain link according to claim 9, wherein said link is arranged to be interconnected to a plurality of other chain links.

17. Conveyor chain link according to claim 9, wherein said substantially partially spherical element and said link are manufactured of friction attenuating materials.

18. Conveyor chain link according to claim 9, wherein a top portion of said substantially partially spherical element is removed.

19. Conveyor chain link according to claim 9, wherein said pin is fixed at least to said first hole.

20. Conveyor chain link according to claim 9, wherein said pin is fixed at least to said second hole.

21. Conveyor chain link according to claim 9 wherein said pin is fixed at least to said bearing element, said first hole and second hole.

22. Conveyor chain link according to claim 17, wherein said friction attenuating material of said substantially partially spherical element is an acetal plastic.

23. Conveyor chain link according to claim 17, wherein said friction attenuating material of said link is a polyamide.

* * * * *

UNITED STATES PATENT AND TRADEMARK OFFICE
CERTIFICATE OF CORRECTION

PATENT NO.     : 6,364,094 B1
DATED          : April 2, 2002
INVENTOR(S)    : Ake Alstmar It is certified that error appears in the above-identified patent and that said Letters Patent is hereby corrected as shown below:

Column 3,
Line 19, after "with" insert -- a --.

Column 9,
Line 8, after "direction", insert -- , --.

Column 10,
Line 9, "curve" should read -- curved --.

Signed and Sealed this

First Day of October, 2002

Attest:

Attesting Officer

JAMES E. ROGAN
Director of the United States Patent and Trademark Office